United States Patent [19]

Truong et al.

[11] Patent Number: 4,761,069

[45] Date of Patent: Aug. 2, 1988

[54] CONTACT LENS AND METHOD OF MOLDING

[75] Inventors: Van-Tan Truong, Northcote; Rodney D. Watkins, Goolwa, both of Australia

[73] Assignee: Sola International Holdings Limited, Morphett Vale, Australia

[21] Appl. No.: 844,662

[22] Filed: Mar. 27, 1986

[30] Foreign Application Priority Data

Mar. 29, 1985 [GB] United Kingdom ............... 8508247

[51] Int. Cl.⁴ .................. B29D 11/00; G02C 7/04
[52] U.S. Cl. ......................... 351/160 H; 249/134; 264/2.3; 264/2.6; 264/337; 425/808
[58] Field of Search .............. 264/1.1, 2.6, 2.2, 337, 264/2.3; 425/808; 351/160 R, 160 H; 249/134

[56] References Cited

U.S. PATENT DOCUMENTS

| | | | |
|---|---|---|---|
| 3,361,858 | 1/1968 | Wichterle | 264/2.6 |
| 4,055,378 | 10/1977 | Feneberg et al. | 264/2.6 |
| 4,347,198 | 8/1982 | Ohkada et al. | 264/2.6 |
| 4,495,313 | 1/1985 | Larsen . | |
| 4,534,916 | 8/1985 | Wichterle | 264/2.1 |
| 4,597,918 | 7/1986 | Neefe | 264/2.6 |
| 4,680,336 | 7/1987 | Larsen et al. . | |

Primary Examiner—James Lowe
Attorney, Agent, or Firm—Burns, Doane Swecker & Mathis

[57] ABSTRACT

A soft contact lens made of a hydrated polymer with an overall water content in the range of 40% to 90% by weight has a water content at the front surface of the lens which is at least 3 percentage points higher than the water content at its rear cornea-contacting surface, as measured by use of an Abbe refractometer. The lens is made from a monomer capable of polymerizing to form a clear transparent partially swollen hydrogel polymer and a diluent forming from 15 to 50% by weight of the moulding mixture, which is moulded between a convex and a concave mould member of different materials chosen so that the lens has the different water contents at its surfaces, as mentioned above. After curing, the mould members are separated with the partially swollen lens adhering to the convex mould member and the whole immersed in an aqueous medium, which may be a weak alkali solution, so as to cause the lens to separate from the convex mould member, to substitute water for any replaceable non-aqueous diluent in the lens, and to cause the lens to swell to substantially its fully hydrated state. The swollen lens is then transferred into saline solution which replaces the water and is packaged and sealed in saline solution in a container. The lens may be sterilized by treatment in an autoclave before and/or after packaging and sealing.

16 Claims, 4 Drawing Sheets

CONTACT LENS AND METHOD OF MOLDING

BACKGROUND OF THE INVENTION

1. Field of the Invention

The present invention relates to soft contact lenses made of a hydrated polymer or hydrogel and methods of forming such lenses.

2. Description of the Prior Art

Soft contact lenses must have a high level of oxygen transmissibility so as to avoid any adverse effect on the eyes of the wearer through insufficient oxygen being supplied to the cornea. Present lenses rely on using materials which are permeable to gases such as oxygen and carbon dioxide, since the cornea is avascular and acquires oxygen directly from the atmosphere in order to respire. Soft or hydrogel lenses are formed from polymers which when hydrated swell to a soft jelly like consistency and can be worn comfortably on the eye. It is known that the oxygen permeability of a hydrated contact lens is related to its equilibrium water content. A high water content is therefore desirable as the "dissolved" oxygen permeability of hydrogels increases almost exponentially with increasing water content up to a limiting value equal to the oxygen permeability of water. Much work has been devoted to developing polymeric materials which will form hydrogels with a high water content yet be sufficiently strong to withstand the physical stresses which will inevitably occur as the lens is handled by the wearer in placing or removing the lens from the eye. The transfer of oxygen and other gaseous species through known lenses is related to the fall in oxygen concentration from the lens surface in contact with the atmosphere to the concentration at the surface in contact with the eyes.

As stated above, the dissolved oxygen permeability of a hydrogel material is related to the water content of the lens. In turn the oxygen flux (F) through the lens into the corneal epithelium required for any contact lens thickness (L) is related to the difference ($\Delta p$) of oxygen tension across the lens and to the dissolved oxygen permeability (Pd) of the material forming the lens. F may be expressed as:

$$F = \frac{P_d \times (\Delta p)}{L}$$

The transfer of oxygen to the corneal epithelium is a complex physiological process and while calculations can be made of oxygen flux demand, these can be based on an over-simplification of the real in vivo situation which occurs when the lens is in place on the eye. Measurements are difficult as the oxygen requirements of one person can differ from those of another. in fact there are groups of people who find existing soft contact lenses impossible to wear because there is insufficient transfer of oxygen. Many papers discuss the requirements for "dissolved oxygen permeability" and in one such paper Ng and Tighe (British Polymer journal December 1976 page 118 to 123), apart from discussing the design requirements of hydrogel materials to be used for contact lenses, point out a number of factors which can complicate a theoretical approach to the problem of oxygen transfer namely: "(a) the equilibrium water content of a hydrogel contact lens, such as Hydron or Bionite, has been found to be lower in the eye than in the saline soaking solution, which is in turn lower than in distilled water. (b) The evaporation of water from the anterior surface of the contact lens during wear might result in the back flow of water from the layer of the tear fluid between the contact lens and the cornea, and hence a reduction in the oxygen tension at the epithelial surface. (c) Because of the presence of solutes in the tear fluid, the solubility of oxygen in the tear fluid may be lower than that in distilled water. (d) Because of the presence of solutes in the tear fluid, again, the structure of water in the hydrogel contact lens worn in the eye may not be the same as in distilled water and so may affect the oxygen permeability. (e) The oxygen consumption rate of the human cornea varies from one person to another and is not constant for a given individual. (f) Under closed-eye conditions, the eye-ball movement may contribute to tear fluid replenishment behind the lens.

A calculation of minimum oxygen flux for particular requirements can be made, and general guidance given that such a flux is likely to be attained or exceeded at the temperature of the eye with lens materials having particular levels of oxygen permeability. The paper quoted suggests a water content of 65% at 34° C. "provides a reasonable basis for meeting problems of manufacture and visual stability with the oxygen consumption requirements of the cornea over successive day and night cycles."

One of the complications referred to is the fact that at certain levels of loss of water from the front surface of the lens there can be a back flow of water from the cornea contacting surface of the lens thereby causing a reduction of oxygen tension at the epithelial surface. This is a recognised problem which has been mentioned by several authors as having a limiting effect on the spread of the use of soft hydrogel contact lenses.

All soft contact lenses available at present have virtually the same water content at both major surfaces of the lens. Once placed in the eye, there is a drop in water content but this occurs in a uniform manner so that the content at both surfaces remains the same. However, if due to climatic conditions or any other reason there is a loss of water from the front surface of the lens, this may be sufficient to reduce or reverse the transfer of oxygen to the cornea.

Oxygen permeability (DK) is an intrinsic property of the materials used for hydrogel lenses, and the limiting factor to date in increasing the permeability of the hydrogel has been the fact that the maximum level will be that of the DK of pure water. At present if one has two lenses, namely a thick lens and a thin lens made of the same hydrogel material, the thin lens will have a higher oxygen transmissibility (DK/$_L$), i.e. it will allow greater amounts of oxygen to pass through, but there are limits to how thin one can make a high water content lens and still have a sufficiently robust lens to withstand the stresses of even one insertion in the eye.

SUMMARY OF THE INVENTION

The present invention aims to provide lenses which will provide a particularly high rate of transfer of oxygen through the lens and will therefore be capable of being kept in the eye for extended periods.

According to the invention, there is provided a soft contact lens made of a hydrated polymer, having a front surface and a rear cornea-contacting surface and an overall water content in the range of 40% to 90% by weight, wherein the hydrated polymer has a water content at the front surface of the lens which is at least 3 percentage points higher than the water content at its rear cornea-contacting surface, as measured by use of an Abbe refractometer. Preferably the water content at the front surface is from 4 to 25 percentage points higher than the water content at the rear cornea-contacting surface. Because the water content at the rear surface is lower than that at the front surface, it is believed that there will be a diffusive flow from front surface to back surface of the lens when in use, thus actively promoting the transfer of tear fluid containing dissolved oxygen directly through the lens to the cornea. Thus there is not sole reliance on the passive transfer of oxygen based on the oxygen concentration or tension at the epithelium being lower than at the front surface of the lens. This transfer of tear fluid will increase the oxygen flux value over that of a conventional lens of the same overall water content but with the same or substantially the same water content at both surfaces.

Overall water content has generally been measured by a method involving dehydration of the lens, using the equation:

$$\% \text{ Water Content} = \frac{(\text{wet weight} - \text{dry weight})}{\text{wet weight}} \times 100$$

Such a method is time consuming and whatever system is used to dry the lens one can never be sure that all water has been driven off, and only solid material remains. More recently, a method has been described of measuring the water content of a hydrogel lens by means of an Abbe Refractometer.

The refractometer method is based on the use of an instrument which measures the refractive index of the surface of the hydrogel. For an article of uniform water content, this can be considered to measure the overall water content of the article, but in fact the measurement is made only at the surface. The conversion of the measured refractive index value into a water content is based on the accepted hypothesis that the refractive index of the hydrated material is a non-linear function of water content and can be calculated using the refractive indices and densities of the dry polymer and the solution in which the lens is held in a hydrated state. The technique is described in detail in a paper by Dr. Wilhelm Teurle entitled "Refractive Index Calculation of Hydrogel Lenses", International Contact Lens Clinic Vol 11 Number 10 pages 625–628 (1984). For any particular polymer it is possible to construct a graph from which the approximate water content may be read off once a refractive index reading is given. Certain available refractometers also have a scale giving a solids content reading which can be used in the comparison of one lens with another. Thus it is possible to determine for any lens surface simply and rapidly the water content of the surface of the lens presented to the instrument for measurement. The instrument may even be calibrated for the particular polymeric composition used to form the hydrogel but when both surfaces are being measured to determine whether a difference in water content exists, the absolute value for each surface is unimportant. Thus one can take a lens purchased in the open market, or a lens removed from a subject's eye, and rapidly determine whether a water content difference exists.

Lenses in accordance with the invention have been found to be capable of being kept in the eye for extended periods without any adverse effect on the cornea epithelium structure.

We prefer to form the lens of the invention by a casting process comprising the steps of (a) introducing into a lens casting mould a mixture comprising at least one monomer capable of polymerising to form a clear, transparent, partially swollen hydrogel polymer and a diluent forming from 15 to 50% by weight of the mixture, and causing the monomer or monomers to polymerise to form said hydrogel polymer, the mould cavity being formed between a convex member and a concave member, said mould members having opposed mould surfaces made of different materials chosen so that the lens formed in the mould from the hydrogel polymer has a water content at its convex front surface which is at least 3 percentage points higher than the water content at its concave rear surface, as measured by use of an Abbe refractometer, (b) separating the mould members with the partially swollen lens adhering to the convex mould member, (c) immersing the partially swollen lens, while still adhering to the convex mould member, in an aqueous medium so as to cause the lens to separate from the convex mould member, to substitute water for any replaceable non-aqueous diluent in the lens and to cause the lens to swell to substantially its fully hydrated state, (d) transferring the swollen lens into saline solution to replace substantially all the water by saline solution, and (e) packaging and sealing the lens in saline solution in a container.

Casting the lens in this way, we have found it possible to achieve a satisfactory water content difference between the two lens surfaces. The process preferably also comprises the step of sterilising the lens by treatment in an autoclave before and/or after packaging and sealing. In some cases, it has been found advantageous to immerse the lens in a weak alkali solution so as to replace hydrogen on carboxyl groups within the polymer matrix by the alkali cation. The immersion in weak alkali solution may be effected by employing the weak alkali solution as the aqueous medium in which the partially swollen lens is immersed while still adhering to the convex mould member. These steps have been found to tend to increase the water content difference between the surfaces.

It would appear probable that polymerisation and/or cross-linking at the rear surface takes place to a greater degree than at the front surface, thus ensuring that the hydrogel formed has a lower capacity for water at the back surface.

The diluent has been found essential to ensure that the lens is directly formed in a partially swollen or partially hydrated state, and not as a xerogel. Any known diluent for hydrogels can be used. These materials are also described as extenders or space creators, and include water, glycerol, ethylene glycol, diethylene glycol and the borate ester of glycerol. We prefer to use a mixture of glycerol and water as the diluent. The diluent content of the partially swollen lens when formed is preferably at least 35% and in the range 15 to 50%, but water alone must not exceed 40% or adverse effects occur.

Casting is preferably carried out in a rigid cavity formed between a convex mould and a concave mould, there being some means to allow flow of additional polymerisable mixture into the mould cavity as polymerisation occurs.

The use of two mould members of different materials is essential for achieving a water content difference between the front and back surfaces of the lens.

As the measurement of the final lens to determine whether there is a satisfactory water content difference from back to front surfaces is so simple, the selection of mould materials for pairs of materials from which to form lenses is merely a matter of time and effort. As a general guidance in selecting materials for screening, there are certain general characteristics which will contribute to the achievement of a difference in water content. This guidance is in no way intended to be limiting. The convex mould surface should generally be made of a material having a higher surface energy than the material of the opposed concave mould surface. The material likely to be found satisfactory for the concave mould surface will have a hydrophobic character when in contact with the casting mix, and should desirably have an open surface morphology. On the other hand, the convex mould surfaces used to cast the rear cornea contacting surface are likely to be chosen from materials having a hydrophilic character and a fine surface finish such as glass.

Materials may be simply screened for their suitability as mould surfaces by casting monomer mix between two flat plates of the materials in question with a ring gasket separating them and containing the monomer mix in place. It is clearly impossible to investigate all the possible permutations and combinations of materials and surface treatments but the simple screening method using two flat plates reduces such an investigation to the level of a routine overnight experiment.

As the difference in hydrophilicity and hydrophobicity between two materials is a matter of degree, two polymeric materials, e.g. nylon and polypropylene, can be sufficiently different in character to obtain a water content difference between the lens surfaces when used in casting.

When the materials are the same or are not sufficiently different in their ability to influence the polymerisation, no real difference in water content is found between one surface and the other of the lens. We prefer to mould the front surface of the lens by contact with polypropylene and the rear cornea contacting surface by contact with glass.

Any monomer or monomer mixture capable of forming a clear transparent hydrogel after polymerisation and hydration can be used. We prefer to use as the main component, the commercially available major constituent of most soft lenses, namely hydroxy ethyl methacrylate (HEMA). This material, when cross-linked, forms a hydrogel. Other monomeric materials which can be added to the monomer mix include:

N-vinyl pyrrolidone
Methacrylic acid and its esters

Monomers, particularly useful in the practice of this invention for admixture with HEMA, include hydrophobic acrylic esters, such as lower alkyl acrylic esters, the alkyl moiety containing 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate or various mixtures of these monomers. For increased dimensional stability the above monomers or monomer mixtures are further admixed with a minor proportion of di- or polyfunctional polymerisable species to cause cross-linking of the polymeric matrix as polymerisation proceeds. Examples of such di- or polyfunctional species include:

divinylbenzene, ethylene glycol diacrylate or di-methacrylate, propylene glycol diacrylate or di-methacrylate, trimethylol propane trimethacrylate Other monomeric materials suitable for producing lenses by processes according to this invention are hydrophilic monomer mixtures forming three-dimensional cross-linked networks such as those disclosed in U.S. Pat. No. 3,822,089. Illustrative hydrophilic monomers include water-soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g. ethylene glycol monomethacrylate, ethylene glycol monoacrylate, diethylene glycol monomethacrylate, diethylene glycol monoacrylate, propylene glycol monomethacrylate and dipropylene glycol monoacrylate; the N-alkyl and N,N-dialkyl substituted acrylamides and methacrylamides such as N-methylmethacrylamide, N,N-dimethyl-methacrylamide, and the like; N-vinylpyrrolidone-; the alkyl substituted N-vinyl pyrrolidones, e.g. methyl-substituted N-vinyl pyrrolidone, glycidyl methacrylate glycidyl acrylate; and others known to the art.

It is essential, when polymerising such hydrophilic monomers or mixtures thereof, that a three-dimensional cross-linked network be formed since the polymerised materials absorb water and become soft and flexible and would lack shape retention if not cross-linked. For this purpose it is necessary to employ small amounts of cross-linking monomers such as those illustrated above.

We believe that the use of an organic initiator such as di-isopropyl peroxydicarbonate is advantageous. This material is preferably used as the mixture of materials produced by the reaction of sec-butyl chloroformate, isopropyl chloroformate, and hydrogen peroxide in the presence of alkali. The other components formed are isopropyl sec-butyl peroxydicarbonate and di-sec-butyl peroxydicarbonate. There may be a differential distribution of catalyst due to either the catalyst having an affinity for the hydrophilic mould surface without being deactivated by that surface, and/or the catalyst being deactivated in contact with the hydrophobic mould surface, the end result being a greater degree of polymerisation of the rear surface than the front surface of the lens.

The curing conditions, the method of removal of the lens from the moulds, and the nature of the monomer mix used to form the polymer all influence the ability of the lens to hold water, and hence the measured water content. It is believed however that they have no major influence on whether a difference in water content can be measured between the front surface and the rear cornea contacting surface of the lens. The results of our comparative experiments support the view that it is the nature of the casting surfaces which determine whether a difference will exist, and the other variables operate no differently in their influence on water content than they would in a casting system where both mould surfaces are made of the same materials. Curing in an air oven, curing in a water bath and curing using U.V. light only produce a water content difference when the mould surfaces used to form the surfaces of the lenses are different in character. One problem in attempting to specify more closely how to select pairs of casting surfaces beyond the simple screening test is that it is sometimes difficult to determine the exact nature of the surface of a polymeric material. With a particular sample of polyethylene used in conjunction with glass, no water content difference was obtained, although the only variable from previous experiments was the substitution of polyethylene for polypropylene. The fact that polyethylene behaves differently from polypropylene could be related to a basic difference in the structure of both polymers, e.g. polyethylene has no pendant groups. However differences in manufacturing techniques could have a major influence on the surface character of a polymeric material. It is therefore impossible to determine easily what is the factor that influences the polymer mix and results in the polymerisation and hence the water content at one surface of the lens being different from the other. It is apparent from the work carried out that while the process is complex, its effect can be measured simply and rapidly by means of the Abbe Refractometer. There is therefore no need to provide the man practiced in the art with a theoretical basis for predicting whether a particular pair of mould surfaces will provide a satisfactory water content difference with a particular monomer mix, under particular curing conditions, as this can be determined by one casting. We do believe, however, that by ensuring that the mould materials chosen have a major difference in surface energy, it will be found that as long as the surface energy of the surface/surfaces has not been altered by any treatment either during or after manufacture of the shaped mould, a difference in water content from one surface to the other of the cast lens will be found.

The casting of lenses is preferably carried out in such a manner as to obtain lenses at a cost such that they can be disposed of by the wearer at regular intervals. Such a manner must produce lenses in a precisely reproduceable way so that one lens can replace another without the need for a fitting whenever a new lens, or pair of lenses is adopted. We have found that lenses of the kind described above can be produced by the casting processes described so that not only are the desired properties to achieve satisfactory oxygen transfer obtained but the lens are also produced in a sufficiently precise manner as to be readily replaceable and at a cost which enables them to be discarded after a limited period of use. The lenses are designed to be handleable for perhaps four or five insertions but to have a relatively limited life so avoid use beyond a desirable change over period. The ability of the lens to transfer oxygen at a high rate will further reduce the risk of damage to the cornea should a wearer continue to wear a lens beyond the normally recommended period of wear.

The polymerisation of the moulding mixture may be caused by subjecting it to a standard curing procedure e.g. by heating the moulding mixture in the mould at a temperature rising from substantially 65° C. to substantially 100° C. over a period of substantially 1¼ hours, followed by a secondary cure at substantially 120° C. for substantially ½ hour.

We have found by finishing the polymerisation with a secondary cure at substantially 120° C., the lens is caused to adhere to the convex mould member when the mould members separate. We prefer to remove the lens from the convex mould member by immersion in de-ionised water or water of substantially equivalent purity so as to cause the lens to separate from the mould member, substitute water for any replaceable non-aqueous diluent, and cause the lens to swell to substantially its fully hydrated state. In those cases where there are carboxyl groups within the polymer matrix, this treatment may be followed by immersing the lens in weak alkali so as to replace hydrogen on all or substantially all of the carboxyl groups within the polymer matrix by the alkali cation present. It is also possible to combine the two steps and use an aqueous solution of a weak alkali to separate the lens, hydrate the lens, and replace hydrogen on all or substantially all of the carboxyl groups with the alkali cation all in one step.

As indicated above, the materials to be used as the mould members may be selected for screening on the basis of differences in surface energy. A method of calculating the surface energy of a solid is described in POLYMER SURFACES by B. W. CHERRY, CAMBRIDGE UNIVERSITY PRESS 1981, chapter one pages 13 to 17. D. A. KAEBLE, PHYSICAL CHEMISTRY OF ADHESION, WILEY 1971, chapter five, pages 149 to 170 contains an extensive discussion of the surface energy of polar and non-polar solids.

Materials which have a high surface energy and can be used for the convex mould part include machineable ceramics, silica or quartz glass, boro-silicate glass, soda lime glass, and electroformed nickel. Low surface energy materials include polymeric materials which can be easily formed to the desired shape by injection moulding, such as polytetrafluoroethylene and polypropylene.

The casting cavity is preferably formed by providing a rigid step which separates one mould member from the other and thus prevents the casting surfaces directly contacting one another, while forming a rigid casting cavity. The shape of the step is used to determine the profile of the edge of the finished lens. The mould members are designed so that the part of the convex member extending from the casting surface is partly surrounded by the monomeric mixture when the mould cavity has been filled so that, on shrinkage within the cavity, mixture is available to flow into the cavity and ensure that the cast, partially swollen, lens reproduces the shape of the mould cavity. The rigid step is preferably provided on the concave mould casting surface.

The casting to a partially swollen state using a mixture which contains particular quantities of diluent assists, in conjunction with other factors, the relatively easy release of the partially swollen lens from the mould surface to which it adheres. The presence of diluent provides effective control over adhesion to mould surfaces when associated with an appropriate choice of mould materials. The mould cavity is kept rigid and shrinkage of the moulding mixture during polymerisation is accommodated by the monomer mixture flowing from a reservoir into the cavity by capillary action at the junction of the two mould parts. This ensures a good control over centre thickness of the finished lens and avoids problems with edge quality. We have found that the use of a casting mixture with an effective diluent content combined with particular choices of mould material gives us optimum yields and reproducibility.

The amount of added diluent is limited to that which can be added without the mix becoming cloudy due to the diluent beginning to separate in the form of an emulsion rather than simply acting to dilute the mixture. We have found that if the quantity of diluent falls below 15%, it is impossible to remove the lens after polymerisation from the mould surface. If water is used on its own, removal from the mould surface takes longer than when water is used in admixture with other diluents. In addition, the use of water alone in quantities of more than 40% results in a hazy material, while casting problems are experienced when the total quantity of diluent exceeds 55%. It is also found that when using glycerol on its own, separation from the mould surface during polymerisation can occur to a limited extent, thereby reducing yields. We have found that mixtures of water and glycerol in which glycerol is in excess result in the ability to remove the lens from the mould surface to which it is adhered in a satisfactory time and with no reduction in yields due to separation. A preferred ratio is 2 parts glycerol to 1 part water.

The presence of both methacrylic acid and glycerol in the polymerised lens after the initial cure will, it is believed, provide the reactants necessary for an esterification reaction to take place when the temperature is raised further. This will occur if the polymerised lens is heated to 120° C. for times of the order of 15 to 30 minutes during the secondary cure. Such an esterification could explain the reduction in adherence of the lens to the mould surfaces and the ease of achieving separation. We therefore prefer to have methacrylic acid and glycerol present in the monomer mix and to ensure that some free methacrylic acid is present when the secondary cure is commenced.

As a polymerisation initiator we use an organic polymerisation initiator in preference to an inorganic initiator.

It is possible that there may be a difference in the distribution of monomer species either related to the reactivity of the monomers or to the influence of the mould surfaces. In the case of a mix containing as a major components hydroxy ethyl methacrylate (HEMA), N-vinyl pyrrolidone and methacrylic acid, Fourier Transformation Infra Red Analysis of the concave and convex lens surfaces shows one surface to be HEMA rich polymers while the other is richer in methacrylic acid and N-vinyl pyrrolidone derived polymers. Hence the refractive index difference may reflect a difference in polymer structure as well as a water content difference.

The rigidity or form stability of a soft contact lens can be related to the flexibility of the lens. Flexibility is measured in terms of the lens displacement l, produced by a saline column of height h. Flexibility can be used to measure the handleability of a lens and to check on its form stability in relation to changes in polymer composition or process of formation. Flexibility is of course also related to the centre thickness of the lens. We have found that as higher water contents are approached at particular ranges of centre thickness, the displacement l increases drastically, going from a lens of 75% final average water content to 85% final average water content. It is therefore better to decrease the centre thickness of a 73–75% water content lens than to increase the water content to 80% or over to obtain the same or higher oxygen permeability.

The effects of various changes in the conditions under which polymerisation is carried out such as curing cycle, curing initiator concentration, and nature of diluent have shown that for the same thickness and average water content, changes in these parameters once they have been selected to achieve a particular water content have in general little effect on overall mechanical strength.

Examples of monomer mixtures which have been found satisfactory are given in the examples below. The use of these mixtures under varying curing conditions is also illustrated.

As indicated above we prefer to achieve the condition where the polymerised lens adheres preferentially to the convex mould member, and is removed from the convex mould member by immersing the convex mould without cooling in de-ionised water at 60° C. for ten minutes. We have found that where carboxyl groups are present a subsequent treatment which consists of immersing the lens in a 2% solution of sodium bicarbonate means that in about 30 minutes any mobile hydrogen is replaced in carboxyl groups by sodium and the lens has also reached a fully swollen state. The lens in the course of such treatment is hydrated to an overall water content of at least 60% in order to achieve a consistently satisfactory oxygen permeability. We prefer to hydrate to an overall water content in the range 60 to 75%. The water content is governed by the nature of the monomer mix and the curing conditions chosen and is now an area where there is sufficient guidance in the literature for the man practiced in the art. The lens floats free from the mould during the deionised water treatment and can then be placed in saline solution after the alkaline treatment (if this is carried out) to exchange water within the lens for saline solution. The lens can also be removed from the mould surface by omitting the treatment with de-ionised water, and utilising the treatment with mild alkali to cause the lens to separate from the mould surface and swell to its fully swollen state. In addition to a 2% solution of sodium bicarbonate other equivalent mild alkali treatments can be used e.g. a weak ammonia solution.

The lens is then packaged in a sealed container in saline solution and supplied to the wearer in that form so that it is untouched until it is to be inserted by the wearer in the eye for the first time. This can only be done because of the high degree of reproducibility obtained from one lens to the next by using the processes of the present invention. Up to eight sets of lenses may be supplied after the first fitting with change over dates marked on the packages.

We have found the design of the profile of the peripheral edge the lens is of particular importance in relation to the following factors:
 (a) lens casting performance
 (b) edge strength or toughness
 (c) wearer comfort Lens casting performance is measured by the yield of saleable lenses from the casting operation. This yield can be reduced by separation of the lens from the mould surface during curing. Such separation results in surface defects, and produces an unacceptable lens. Separation usually arises from a lack of adhesion at the part of the mould where the edge of the lens is being formed and one way of reducing losses due to separation is by choosing a particular shape for the edge forming part of the cavity in which the lens is cast.

As regards the overall shape of the peripheral edge, we have found that a blunt edge is to be preferred to a sharp knife edge.

Such a blunt edge shape of lenses is determined by the configuration at the interface between the convex and concave mould members. When casting in a rigid cavity, the cavity is bounded by the casting surfaces of the convex member and the concave member. The step which prevents the convex member contacting the concave member other than at the edge of the step in particular defines the peripheral edge profile of the lens. One design which has proved satisfactory in respect of all three factors is described later by reference the accompanying drawings. The step is so small that its dimensions are stable and any shrinkage after mould manufacture is minimal and has no measureable affect on the performance characteristics of the lens. We have found that the use of a rigid mould assembly in which there is a reservoir for the casting mix means that no edge defects are formed which cause irritation of the wearer's eye, nor affect the optical quality of the lens.

The design of the lenses of this invention is not restricted to any particular set of parameters. Both anterior and posterior surfaces of the lenses may consist of entirely spherical curves or aspherical curves or combinations of both. For example, the central portion of the lens may consist of spherical curves on both the anterior and posterior surface and the periphery of the anterior surface may consist of a steeper or flatter spherical curve, and the periphery of the posterior surface may be aspheric to achieve improved fitting characteristics. In addition, one or both of the surfaces may be toric in the central or optical zone; however, the peripheral portion should preferably be symmetrical with respect to the central axis of the lens to achieve proper positioning of the lens on the eye. Multi-focal lenses may also be made.

The design of the lens must be reproduced in the mould, taking into account the change in dimensions produced on hydrating the finished lens. The concave mould member may be formed by reproducing the design configuration on a convex metal mould, and then injection moulding the moulds from thermo-plastic material. The convex mould member may be formed directly by grinding and polishing a blank to the desired configuration.

One form of the lens of the present invention and of a casting process for forming that lens will be described in more detail with reference to the accompanying drawings.

DETAILED DESCRIPTION OF THE INVENTION

Figure 1:
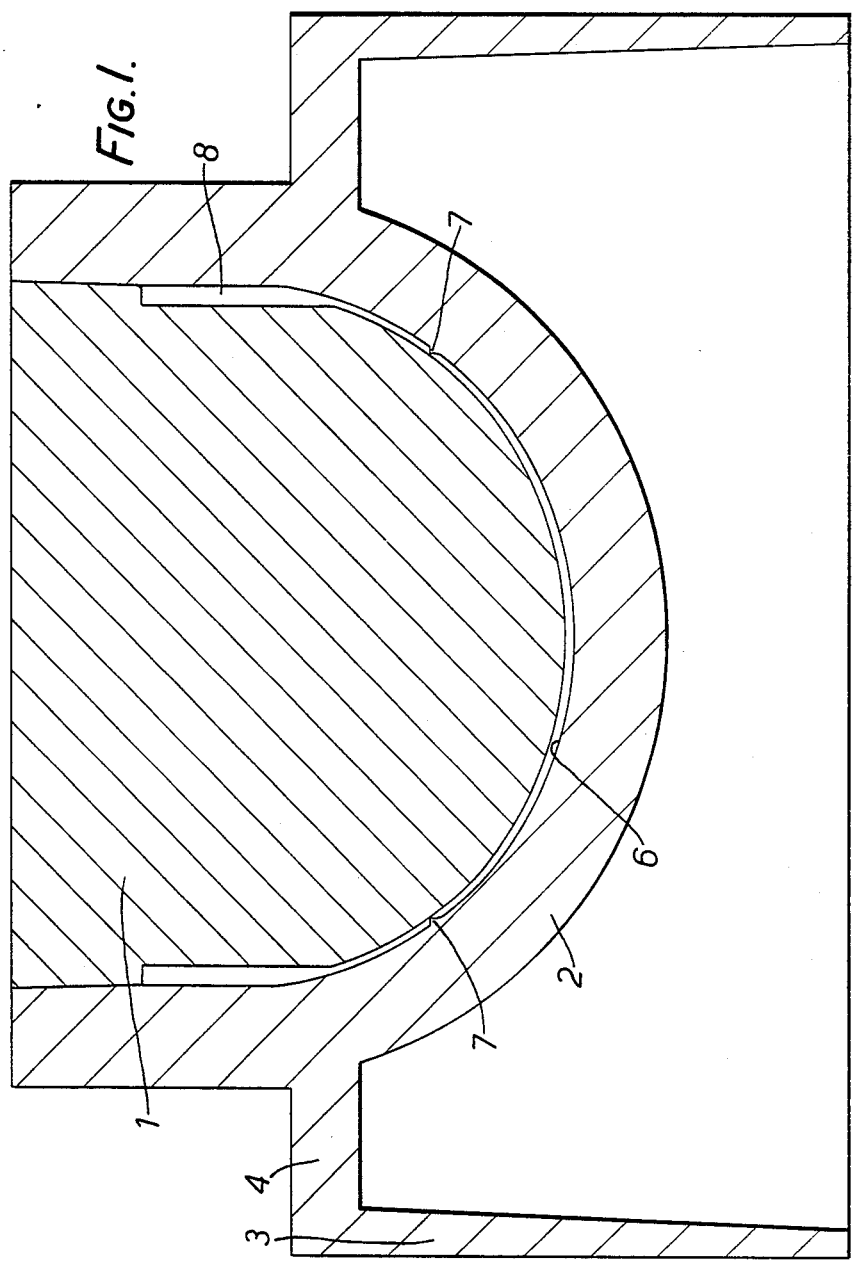
FIG. 1 is a sectional elevation of the mould assembly, showing the concave and convex members of the mould assembled for casting.

The mould assembly shown in FIG. 1 in which the lenses are cast rests on a cylindrical base 3, which is integrally connected by an annulus 4 to the concave mould member 2, the casting surface 6 of which is provided with a rigid step or rim 7. The convex mould member 1 when in the operative moulding position rests against the rim 7, and is shaped relative to the concave member 2 to provide between them a reservoir 8 adjacent to the rim.

The convex mould member 1 is shaped at the end remote from the casting surface to fit within the concave mould member 2 so as to substantially seal the reservoir 8, and reduce any evaporation of materials from the reservoir.

Figure 2:
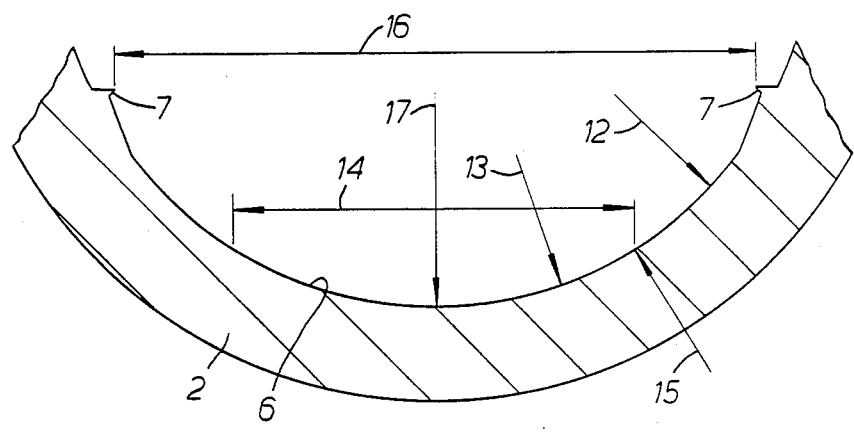
FIG. 2 is a cross-section along the centre line of the concave mould member casting surface for a lens having a different centre curve to a peripheral curve.

The positions of the critical dimensions of a concave mould member surface 6 are identified in FIG. 2. The surface is designed to mould a lens of the kind having different central and peripheral curves.

The positions of the identified dimensions on the mould surface in FIG. 2 are as follows:
16. Diameter inside step 7.
12. Radius of peripheral area.
13. Radius of central area.
14. Diameter of central area.
15. Point of change of curve from peripheral area radius to central area radius.
17. Centre line of mould.

Figure 3:
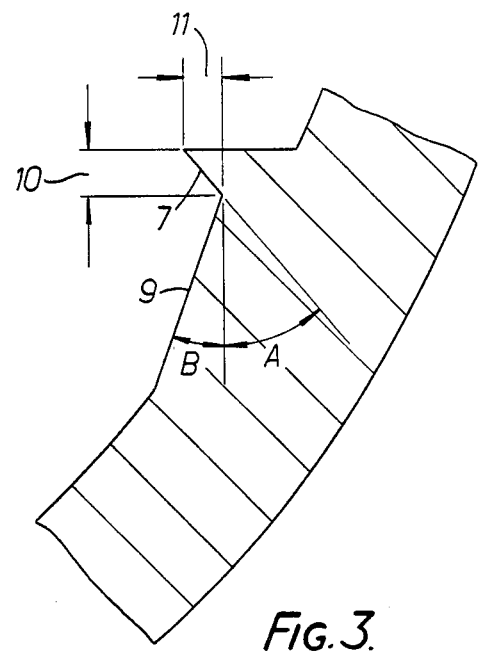
FIG. 3 is an enlarged vertical cross-section of the step against which the convex mould member rests.

The preferred form of step design is shown in FIG. 3, a major identifiable feature being a step chamfer 9 at the step edge. The height 10 of the step edge may vary between typically 0.05 to 0.07 mm, and the length 11 of the step can be between 0.02 and 0.04 mm. Angle A can lie between 30° and 35°, while Angle B can fall in the range 15° to 42°. We have found it satisfactory to use a value of 0.06 mm for 10, and 0.04 mm for 11.

The process of the present invention is carried out by placing a plurality of the polypropylene concave mould members 2 on a flat surface. The concave mould members 2 are then partially filled with a moulding mixture containing as the major component preferably once distilled special grade hydroxy-ethyl methacrylate monomer (containing about 1% ethylene glycol dimethacrylate), a diluent which forms from 15% to 50% by weight of the mixture, a polymerisation initiator, preferably an organic initiator such as iso-propyl percarbonate, and a cross-linking agent selected from those mentioned above. Other materials, such as methacrylic acid and N-vinyl pyrrolidone, are preferably present to vary the nature of the final form of the hydrogel produced (their choice and the proportion of each that can be used is discussed in the more detailed examples below). Sufficient mixture is added so that when the glass convex moulds 1 are placed in the concave moulds 2 as shown in FIG. 1, the reservoirs 8 above the inside step 7 are substantially filled with mixture. The filled moulds are then placed in a circulating oven and cured for 1–4 hours as the temperature is raised to 99.9° C., followed by secondary curing for 15–30 minutes at 120° C. The mould parts can then be separated with the partially swollen lens adhered to the convex mould. Polymerisation of the moulding mixtures can take place at temperatures over the range 20° C. to 120° C. for varying times, depending on the rate at which polymerisation is desired.

After the mould members are separated, the convex mould members with the cast lenses adhering to them are placed in de-ionised water at 60° C. until the lenses separate from the mould members. This takes about 10 minutes.

The lenses are then immersed in a weak alkaline solution to replace hydrogen by the alkali metal cation in carboxyl groups in the polymer matrix, and then in physiological saline solution. During this stage, the water content of the lenses is increased from of the order of 40% to a value in the range 60% to 75% which is related to the nature of the polymeriseable mixture and the curing conditions. The lenses have a water content difference between front and back surfaces of at least 3 percentage points due to the use of glass and polypropylene for the convex and concave mould members, respectively. The lenses are then packed singly with saline solution in containers of the kind shown in FIG. 5, sealed, and the container and contents sterilised in an autoclave. Alternatively, the lenses may be autoclaved before packaging. Apart from providing sterilisation, autoclaving appears to tend to increase the water content difference between the lens surfaces. The containers after cooling are labelled with the lens characteristics. The lenses are then ready, after transmission to the wearer, to be transferred direct by the wearer from the container to the eye. The lenses are supplied as pairs to fit the left and right eye, and the packages can be marked with a tactile symbol to indicate which lens is for which eye.

Each polymerised lens is clear as glass of good optical quality, fully transparent, soft, and resilient. It has an edge which blends smoothly with the cornea surface when the lens is positioned on the eye. The lens does not irritate the eyelid of of the wearer, nor the cornea and moves freely on the eye.

The lens can be inserted by holding it on an applicator and placing it on the cornea of the open eye. The lens clings firmly to the eye surface, and centres itself on the cornea because of the almost perfect fit of the corresponding surfaces of lens and eye. A small difference between the curvature of a cornea and of a lens of the invention, as in cases of corneal astigmatism, is automatically compensated for by elastic deformation of the lens rim.

Properly fitted contact lenses of the invention may be worn for long continuous periods without discomfort, and need only be removed after 3 to 8 weeks of wear for disposal and replacement by a new lens from an unopened package.

Figure 5:
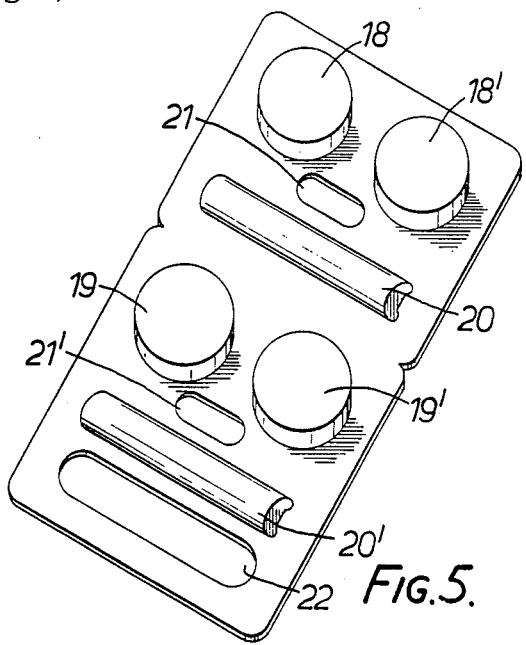
FIG. 5 is a perspective view of a package of the kind in which the lenses can be supplied to the wearer.

FIG. 5 shows a lens package containing two sets of lenses, each of the pairs (18, 18[1], 19, 19[1]) of containers containing a single lens, and in each pair, a lens for the left eye, and a lens for the right eye. Each pair is accompanied by a disposal applicator (20, 20[1]) and space is provided for inserting the date of changeover, at 21 and 21[1], along with a panel 22 for the patient's name. The individual lens containers can either be marked with a symbol indicating whether the lens is for the left or right eye, or the package may be marked to the side of each container.

Figure 6:
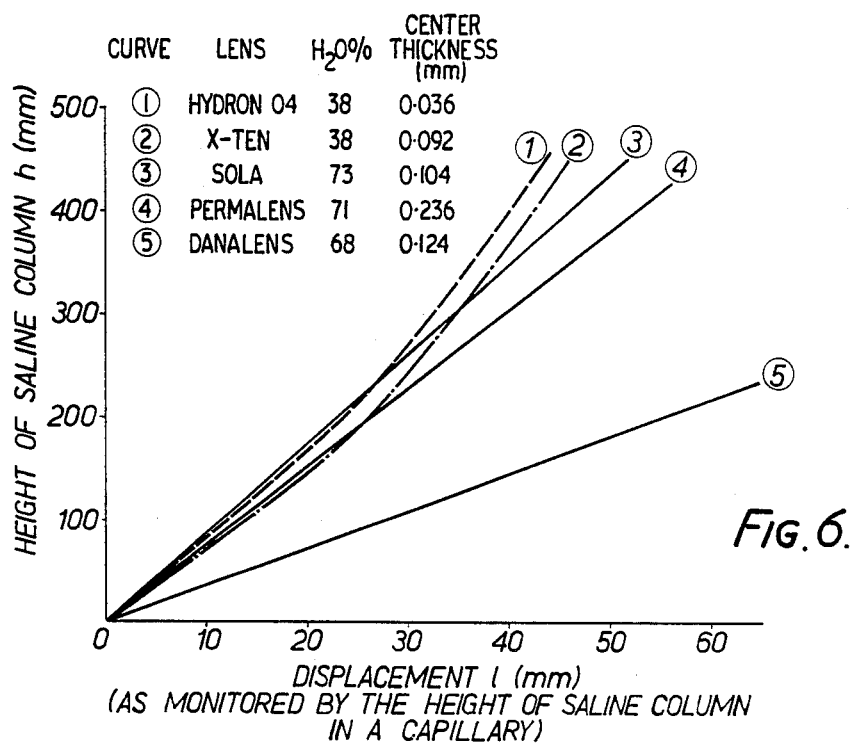
FIG. 6 is a graph showing the flexibility of various soft lenses under varying pressures.

The accompanying Graph (FIG. 6) compares the flexibility of various commercially available high water content soft contact lenses with a lens made in accordance with the present invention.

The displacement 1 in mm is plotted against the height h of saline solution column in mm producing that displacement. The curves plotted on the graph have been numbered and relate to the following lenses:

|  | Overall Water Content % | Centre Thickness (mm) |
| --- | --- | --- |
| (1) Hydron 04 | 38 | 0.036 |
| (2) X-Ten | 38 | 0.092 |
| (3) Lens according to invention | 73 | 0.104 |
| (4) Permalens | 71 | 0.236 |
| (5) Danalens | 68 | 0.124 |

It will be seen that the lens according to the invention has a flexibility comparable with that of most of the other soft lenses with which it has been compared.

Experiments comparing lenses commercially available with a lens according to the invention have shown clearly the basic dependence of tear strength on water content and thickness. Tear strength is determined by clamping the lens so that it acts as a seal to a column of saline solution. The pressure under the lens is increased by increasing the height of the column of saline solution, and the lens is pre-notched with a needle. The tear strength is recorded as the height of the saline column when the notch starts to propagate. Table I below compares a lens of the present invention which was made as described in Example 8 (below) with 6 commercial lenses of varying thickness and water content.

TABLE I

| Lens Type By Origin | Overall Water Content % | Lens Thickness mm | Burst Strength (kpa) | Tear Strength (mm Saline) |
| --- | --- | --- | --- | --- |
| "Permalens" | 71% | 0.23 | 20 | 660 |
| "X-Ten" | 70% | 0.15 | 27 | 702 |
| "Igel" | 64% | 0.108 | 60 | 750 |
| "Hydrocurve II" | 55% | 0.118 | 26 | 600 |
| "Hydron 04" | 38% | 0.050 | 90 | 600 |
| "Danalens" | 68% | 0.144 | 10 | 230 |
| Lens of Example 8 (below) | 75% | 0.110 | 15 | 320 |

The above table shows that the lens of the invention is not as robust as all except one of the lenses with which it has been compared. This is desirable in order to ensure that a lens has life which results in replacement being needed within a predetermined time. All of the above lenses with an overall water content of above 64% will have what is considered to be a satisfactory oxygen transmissibility, as will the very thin "Hydron 04" lens. However the lens which is an example of the present invention will provide a particularly high rate of transfer of oxygen and consequently be capable of being kept in the eye for extended periods.

The following examples illustrate but do not limit the invention.

EXAMPLE 1

Mould members 1 and 2 were manufactured to produce a lens having a power of $-1.00$ Dioptre and diameter of 13.8 mm. The convex mould members 1 were made by polishing and grinding glass. The concave mould members 2 were made by injection moulding from polypropylene using a metal die having a convex shape, an outside diameter of 10.327 mm, a central radius of curvature of 6.986 mm and a peripheral radius of curvature of 6.924 mm, and optic zone diameter of 8.312 mm. The dimensions of a finished hydrated lens cast from mould members made in this way when swollen to a water content of 73% are given in Table II below, see lens No. 1.

Figure 4:
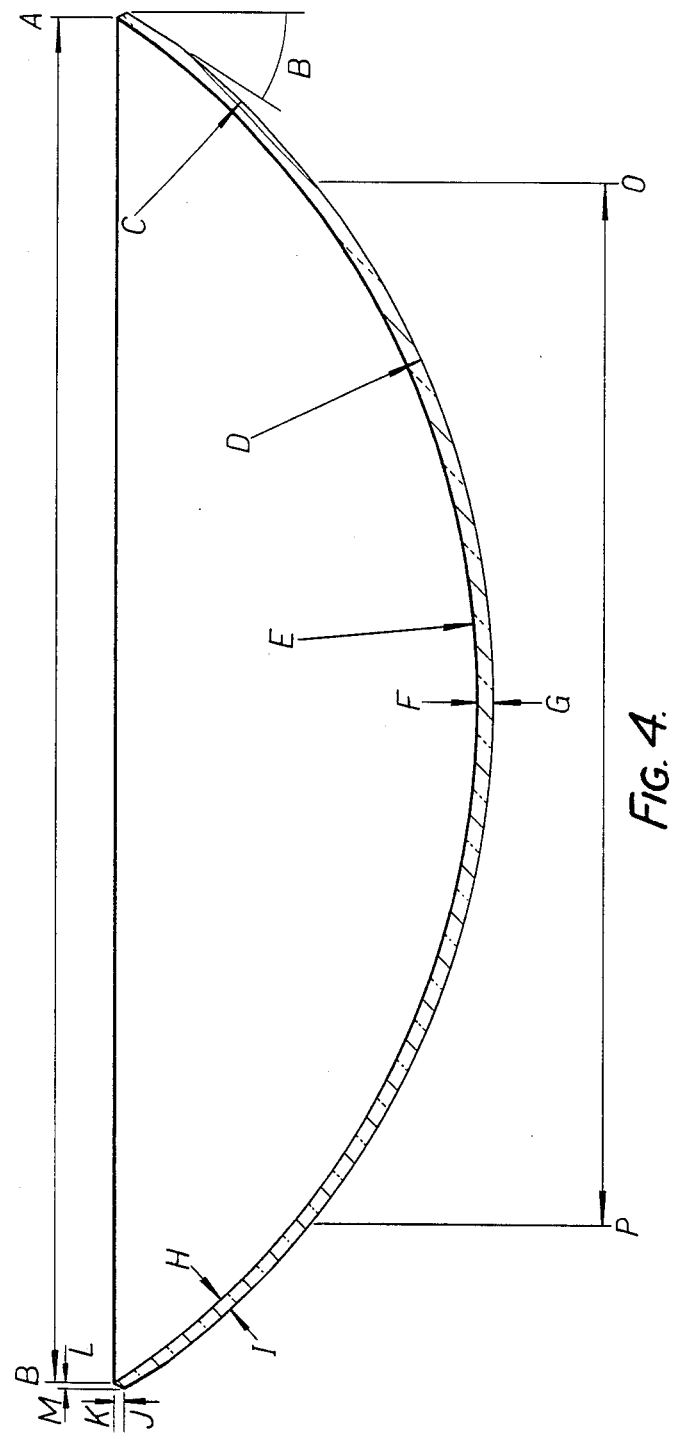
FIG. 4 is a cross-sectional view of a lens design made by the process of the invention identifying the dimensions referred to in examples 1 to 4 below.

The dimensions of two lenses of different powers and diameters made by the process of the present invention are also shown in Table II. The dimensions quoted are identified in FIG. 4 (all lengths being in mm).

TABLE II

| Lens Number | 1 | 2 | 3 |
| --- | --- | --- | --- |
| Lens Power Dioptres | −1.00 | −3.00 | −6.00 |
| Inside Diameter AB | 13.8 | 14.5 | 13.8 |
| Centre Curve Diameter OP | 11.0 | 11.0 | 8.13 |
| Periphery Radius C | 8.95 | 9.01 | 9.01 |
| Centre Radius D | 9.04 | 9.51 | 10.33 |
| Optic Zone Curvature (inside Radius) E | 8.8 | 8.8 | 8.8 |
| Centre Thickness GF | 0.12 | 0.078 | 0.07 |
| Periphery Thickness HI | 0.147 | 0.21 | 0.213 |
| Edge Dimension | | | |
| JK | 0.07 | 0.07 | 0.07 |
| LM | 0.04 | 0.04 | 0.04 |
| Angle B | 33° | 30° | 33° |

The moulds were manufactured to obtain lenses of the above dimensions, taking into account the changes of dimensions on the further hydration of the lenses after casting to reach a water content of 73%, and any changes in the dimensions of the concave mould parts during manufacture.

Examples 2 to 12 below illustrate various changes that can be made in raw materials used, the proportions of such materials, the conditions chosen for polymerisation, and the overall and surface water contents of the lenses. It should be noted that overall water content was measured by dehydrating the lens and measuring the loss in weight, which can give a low figure due to the difficulty of driving off the last few percent of water. The surface water contents were measured using an Abbe Refractometer.

EXAMPLE 2

A lens was formed from a monomer portion as listed under A below, and with diluent portion as listed under B. The proportions used for A:B were 85:15 parts by weight.

| A. Hydroxy ethyl methacrylate (HEMA) | 90% |
|---|---|
| N—vinyl pyrrolidone (NVP) | 4.5% |
| Methacrylic acid (MAA) | 3.6% |
| TMT (Trimethylol Propane Trimethacrylate) | 1.7% |
| Isopropyl percarbonate (SIP) | 0.2% |
| B. Diluent = water alone. | |

The monomer mixture was degassed and filled into a series of moulds, made in the same manner as in Example 1, before curing and cured by raising the moulds and their contents from 75° C. to 99.9° C. in 1 hour, followed by a secondary curing at 120° C. for 15 minutes. The convex mould carrying the lens was immersed in a 2% solution of sodium bicarbonate for 30 minutes. On removal the lens was found to have an overall water content of 60% and a tear strength of 400 mm saline at a thickness of 0.1 mm. At the lens surfaces, the water contents as measured by an Abbe Refractometer were: Front 76%, Rear 61%.

EXAMPLE 3

This was carried out in the same manner as Example 2, except that the diluent portion B used was a mixture of water and glycerol in 1:1 proportions, and the ratio of A:B was 85:15. The lens produced had a tear strength of 400 mm saline at a thickness of 0.1 mm and an overall water content of 61%. Front surface water content was 79% and rear surface water content 62%.

EXAMPLE 4

This was carried out in the same manner as Example 3, except that the ratio of A:B was 63:37. The lens produced had a tear strength of 380 mm saline at a thickness of 0.1 mm and a water content of 68%. Front surface water content was 79% and rear 68%.

EXAMPEL 5

This was carried out in the same manner as Example 2, except the A portion was:

| HEMA | 85% |
|---|---|
| NVP | 6.8% |
| MAA | 5.9% |
| TMT | 1.7% |
| Allyl Methacrylate | 0.4% |
| SIP | 0.2% |

Methylmethacrylate (MMA): 4% by weight of A portion.

The B portion was water.
The ratio of the portions used was:
(A+MMA) B=63:37

The finished lens had an overall water content of 73%, and a tear strength of 320 mm saline at 0.1 mm thickness. Front surface water content was 84% and rear 74%.

EXAMPLE 6

This example only differed from Example 5 in that (1) the B diluent portion was a mixture of water and glycerol in the proportion 1:2, (2) the ratio of (A+MMA):B was 63:37 and (3) the method of releasing the lens from the mould. The finished lens had an overall water content of 69% and a tear strength of 320 mm saline at 0.1 mm. Front surface water content was 85% and rear 70%. While the tear strength of the lens was of the same order as the lens of Example 9, the lens was removed more rapidly from the mould by immersion in deionised water for 10 minutes at 60° C. The lens was treated with 2% sodium bicarbonate solution after removal from the mould surface.

EXAMPLE 7

This Example was carried out in the same manner as Example 6, except that the B portion was water and glycerol in the ration 1:4 by weight and the ratio of (A+MMA):B was 45:55. The finished lens had a tear strength of 280 mm saline at a thickness of 0.1 mm and an overall water content of 74%. Front surface water content was 90% and rear 75%.

EXAMPLE 8

This Example was carried out to demonstrate the use of ethylene glycol as the component B in various proportions as the only variant in the procedure of Example 8. The results obtained at various proportions of (A+MMA):B are given in the Table below.

| (A + MMA):B | Tear Strength (mm saline) 0.1 mm thickness | Overall Water Content | Surface Water Content | |
|---|---|---|---|---|
| | | | Front | Rear |
| (a) 75:25 | 300 | 68% | 91 | 67 |
| (b) 63:37 | 280 | 75% | 88 | 76 |
| (c) 40:60 | 140 | 77% | 87 | 76 |

This Example shows the importance of avoiding excessive amounts of diluent as the water content rises drastically giving a poor tear strength as the proportion of diluent is increased.

EXAMPLE 9

Example 6 was repeated with a modified curing cycle, the mould and its contents were heated from 40° C. to 99.9° C. over four hours, and then given a secondary cure at 120° C. for 15 minutes. No significant difference was detectable in the measured properties of the finished lens of the Example from those measured for the lens of Example 6.

EXAMPLE 10

This was carried out in the same manner as Example 2, except that the lens was removed by the water treatment and treated with alkali in the manner of Example 6, and the A portion was as follows:

| | |
|---|---|
| HEMA | 84.5% |
| NVP | 6.8% |
| MAA | 6.8% |
| TMT | 1.7% |
| SIP | 0.2% |

The finished lens had a water content of 61% and tear strength of 300 mm saline at a thickness of 0.1 mm. Front surface water content was 76% and rear 60%.

EXAMPLE 11

This Example only differs from Example 10 in that the borate ester of glycol was used instead of water as a diluent. No measureable difference could be detected in the finished lens.

EXAMPLE 12

This was carried out in the same manner as Example 10 with different composition for A.
The A portion was:

| | |
|---|---|
| HEMA | 84.7% |
| NVP | 6.8% |
| MAA | 5.9% |
| Polyethylene glycol (400) dimethacrylate | 1.9% |
| Allyl methacrylate | 0.4% |
| SIP | 0.3% |

The finished lens had a tear strength of 300 mm saline, an overall water content of 77% and a thickness of 0.1 mm. Front surface water content was 96% and rear 68%.

The above examples and other experimental work have demonstrated that the mechanical strength of the lens shows relatively little change for changes in concentration of SIP from 0.1 to 0.4%, curing times as varied in the Examples above, and change in the nature of the diluent. We have found from our experimental work that it is preferable to choose the conditions and proportions of raw materials which result in the lens having an overall water content of at least 60% and not more than 75%. At 0.1 mm thickness, we need to achieve a tear strength of at least 280 mm saline and preferably the tear strength should not fall below 320 mm saline at 0.1 mm thickness. A combination, e.g. of a water content of 77% and a tear strength of 140 mm of saline as obtained in Example 8(c) is unacceptable as a saleable lens due to its low fragility.

Oxygen transmissibility is related to both lens thickness and water content. Lenses made by the process of the present invention with a centre thickness of 0.086 to 0.142 mm will have an oxygen transmissibility higher than previous soft contact lenses and as long as the water content falls in the preferred range 60 to 75% no problems are likely to be experienced with oxygen permeability.

Examples 1 to 12 demonstrated the use of varying casting mixes, and curing conditions while always using a glass convex mould and a polypropylene concave mould.

The following examples demonstrate the effects of changes in curing temperature, mould material, and hydration method on the surface water content of the cured polymer. As in examples 1 to 12, the casting mix was made up from component A and component B. Component A was in all cases made up as follows:

| | |
|---|---|
| HEMA | 81.56% |
| MAA | 5.61% |
| NVP | 6.52% |
| Trimethylol Propane Methacrylate | 1.63% |
| Allyl Methacrylate | 0.42% |
| SIP | 0.33% |
| Methyl Methacrylate | 3.83% |

In all except Example 13, the proportion of components A:B was 60.08:39.92.

In the case of Example 13, the proportion of A:B was 63:37.

Component B was a mixture of glycerol and water in the proportions 1 part water to 2 parts glycerol.

The curing conditions used when referred to as standard were 1.25 hours in a heated circulating air oven as the temperature is raised from 65° C. to 99.9° C., followed by 30 minutes at 119° C. The glass moulds with lenses adhering were placed in deionised water at 60° C. for up to ten minutes to allow the lenses to float free. The standard hydration conditions were immersion in a 2% solution of sodium bicarbonate at 68° C. for 30 minutes.

EXAMPLE 13

5 lenses cast using convex glass and concave polypropylene moulds and the standard curing and hydration conditions in February 1985 and then stored in saline were removed from the saline solution in December 1985 and their surface water content measured using an Abbe Refractometer. The average values obtained from measurement of the five lenses was:

| | nd | % H2O |
|---|---|---|
| Front lens surface (cast in contact with polypropylene) | 1.365 | 81.3 |
| Rear lens surface (cast in contact with glass) | 1.3835 | 70.2 |

EXAMPLE 14

8 lenses were cast, cured and hydrated in January 1986 in the same manner as the lenses of example 13, except the quantity of diluent was 40%.
The average values for the 14 lenses were as follows:

| | nd | % H2O |
|---|---|---|
| Front Lens surface | 1.363 | 82.5 |
| Rear Lens surface | 1.3818 | 72.6 |

EXAMPLE 15

In order to evaluate the use of flat plates as a means of identifying satisfactory mould surfaces, a series of commparative tests were carried out. These involved casting the monomer mix between:
(a) 2 glass plates (b) 2 polypropylene plates
(c) 2 glass plates—cured with U.V. light for 1 hour with an irradiance of 765 W/M².
(d) glass plate and polypropylene plate
(e) glass plate and polypropylene plate cured for 24 hours in water at 50° C.
(f) glass plate and polypropylene plate cured with U.V. light for 1 hour with an irradiance of 765 W/M².

(a), (b) and (d) were cured in the standard manner.

The monomer was placed in a space between the two plates defined by a plastic gasket, and the sheets clamped together by spring clips.

The results of surface measurement of the cured material after hydration in the monomer described above were as follows:

|  | nd | % H2O |
|---|---|---|
| (a) 2 glass plates | 1.3895 | 66.8 |
|  | 1.390 | 66.6 |
| (b) 2 Polypropylene plates | 1.376 | 74.8 |
|  | 1.376 | 74.8 |
| (c) 2 Glass plates (U.V. Cure) | 1.383 | 70.5 |
|  | 1.383 | 70.5 |
| (d) Glass plate | 1.3865 | 68.6 |
| Polypropylene plate | 1.376 | 74.8 |
| (e) Glass plate | 1.3775 | 74 |
| Polypropylene plate | 1.3445 | 79 |
| Water cure at 50° C. for 24 hours (material undercured when measurements taken) |  |  |
| (f) Glass plate (U.V. Cure) | 1.38 | 72.4 |
| Polypropylene plate | 1.356 | 87.2 |

The first three tests show how with the same surfaces under the same conditions, approximately the same water content is achieved. The last three simply demonstrate that even under different curing conditions, the values obtained will be different but that different mould surfaces will still produce a differing solids/water content. The examples also demonstrate the value of the use of flat casting surfaces as a means of comparing one casting surface with another.

EXAMPLE 16

A series of experiments were carried out to examine the effect of alternative methods of treating a glass-/polypropylene mould assembly after curing in a situation where the monomer mix was cured in the standard manner but the secondary cure step of 30 minutes at 120° C. was replaced by an alternative procedure and hydration methods were varied. In all of the following examples when the mould was opened the lens was found to adhere to the polypropylene mould. The conditions used and the results obtained were as follows:

|  |  | nd | % H2O |
|---|---|---|---|
| (a) Assembly soaked in water overnight at 65° C., opened and hydrated in standard manner | Front | 1.359 | 85.4 |
|  | Rear | 1.376 | 74.8 |
| (b) As (a) but hydrated in saline after opening | Front | 1.385 | 69.4 |
|  | Rear | 1.405 | 60.5 |
| (c) Assembly soaked in water at room temperature over night, opened and hydrated in standard manner | Front | 1.355 | 87.8 |
|  | Rear | 1.379 | 73.0 |
| (d) As (c) but hydrated in saline after opening | Front | 1.376 | 74.8 |
|  | Rear | 1.402 | 60.6 |

The above examples demonstrate that both the method of removing the lens from the mould, and the method of hydration can cause a difference in overall average water content, but that there seems to be little influence on the differential in water content when one compares (a) to (b) and (c) to (d). This demonstrates the major importance of the casting surfaces in determining the difference in water content between the two cast surfaces.

The removal of the lens from the concave polypropylene mould was more liable to result in damage to the lens and we therefore prefer to operate when using a glass convex mould and a polypropylene concave mould with a secondary cure at about 120° C. so as to cause the assembly to separate with the lens adhering to the glass convex mould.

EXAMPLE 17

In order to determine whether there was any possibility of a temperature effect during curing influencing the water content of the surfaces, two castings were carried out where the polymer surfaces temperatures were measured during curing. In both cases glass and polypropylene plates were used as the casting surfaces, with in one case the cure being in a water bath at 40° C. for 36 hours, and the other in air at 40° C. for 36 hours. The cast plates were hydrated in the standard manner and the results of measurements with the Abbe refractometer were as follows:

|  |  | nd | % H2O |
|---|---|---|---|
| Water cure | Polypropylene | 1.352 | 89.6 |
|  | Glass | 1.3775 | 74.0 |
| Air cure | Polypropylene | 1.345 | 79.0 |
|  | Glass | 1.379 | 73.0 |

No significant difference in polymer surface temperature was detected during either curing cycle.

EXAMPLE 18

The following examples illustrate the use of different plates under standard conditions:

|  | nd | % H2O |
|---|---|---|
| (a) Nylon | 1.371 | 78.9 |
| Polypropylene | 1.362 | 83.5 |
| (b) Glass | 1.379 | 73.0 |
| Polyethylene (additives unknown) | 1.377 | 74.2 |
| (c) Glass | 1.3791 | 73 |
| Polytetrafluorethylene | 1.367 | 80.4 |

The surface cast against the polytetrafluorethylene plate was difficult to measure and the value given is approximate.

|  | nd | % H2O |
|---|---|---|
| (d) GLASS A | 1.3783 | 73.5 |
| GLASS B |  |  |
| GLASS A was twice the thickness of GLASS B |  |  |

It can be seen from the above that is was possible to obtain A substantial difference in water content by casting between nylon and polypropylene, and between glass and PTFE, but not between glass and the particular sample of polyethylene. It is important therefore when considering the use of alternative mould surfaces to evaluate the material by casting a test piece in the manner described above and comparing performance with e.g. a test piece cast between glass and polypropylene.

As the result of the measurements made on the sample produced by casting between plates of glass and polyethylene in Example 18(b) was to give a difference in refractive index value which could have been due to the experimental error in making one or both of the measurements, three concave moulds were injection moulded from high density polyethylene (Hoechst GA 7260H) and used with glass convex moulds to cast lenses in otherwise the same manner as the lenses of Example 14. The results obtained were as follows:

|  |  | nd | Water Content |
|---|---|---|---|
| Mould pair (a) | Polyethylene | 1.374 | 76 |
|  | Glass | 1.376 | 75.8 |
| Mould pair (b) | Polyethylene | 1.371 | 77.8 |
|  | Glass | 1.374 | 76.0 |
| Mould pair (c) | Polyethylene | 1.3700 | 78.5 |
|  | Glass | 1.3765 | 75.5 |

Comparison with Example 14 shows that the glass/polypropylene mould pairs produce a major difference in refractive index compared to the difference produced even in the case of Mould pair (c). Polyethylene of the grade used is clearly not equivalent in performance to polypropylene, and while it is possible some forms of polyethylene may produce a useable lens, its use is clearly not to be preferred over polypropylene.

We claim:

1. A soft contact lens made of a hydrated polymer, having a front surface and a rear cornea-contacting surface and an overall water content in the range of 40% to 90% by weight, wherein the hydrated polymer has a water content at the front surface of the lens which is at least 3 percentage points higher than the water content at its rear cornea-contacting surface, as measured by use of an Abbe refractometer.

2. A contact lens according to claim 1 wherein the water content at the front surface is from 4 to 25 percentage points higher than the water content at the rear cornea-contacting surface.

3. A contact lens according to claim 2 wherein the water content at the front surface is in the range from 74 to 91% by weight, while the water content at the rear surface is in the range from 60 to 82% by weight, as measured by use of an Abbe refractometer.

4. A process for making a soft contact lens, comprising the steps of
(a) introducing into a lens casting mould a mixture comprising at least one monomer capable of polymerising to form a clear, transparent, partially swollen hydrogel polymer and a diluent forming from 15 to 50% by weight of the mixture, and causing the monomer or monomers to polymerise to form said hydrogel polymer, the mould cavity being formed between a convex member and a concave member, said mould members having opposed mould surfaces made of different materials chosen so that the lens formed in the mould from the hydrogel polymer has a water content at its convex front surface which is at least 3 percentage points higher than the water content at its concave rear surface, as measured by use of an Abbe refractometer,
(b) separating the mould members with the partially swollen lens adhering to the convex mould member,
(c) immersing the partially swollen lens, while still adhering to the convex mould member, in an aqueous medium so as to cause the lens to separate from the convex mould member, to substitute water for any replaceable non-aqueous diluent in the lens and to cause the lens to swell to substantially its fully hydrated state,
(d) transferring the swollen lens into saline solution to replace substantially all the water by saline solution, and
(e) packaging and sealing the lens in saline solution in a container.

5. A process according to claim 4 comprising the further step of sterilising the lens by treatment in an autoclave before and/or after packaging and sealing.

6. A process according to claim 4 wherein the lens is immersed in a weak alkali solution so as to replace hydrogen on carboxyl groups within the polymer matrix by the alkali cation.

7. A process according to claim 6 wherein the immersion in weak alkali solution is effected by employing the weak alkali solution as the aqueous medium in which the partially swollen lens is immersed while still adhering to the convex mould member.

8. A process according to claim 4 wherein the convex mould surface is made of a material having a higher surface energy than the material of the opposed concave mould surface.

9. A process according to claim 4 wherein the convex mould surface is made of a hydrophilic material having a fine surface finish whereas the opposed concave mould surface is made of a material having a hydrophobic character when in contact with the moulding mixture and an open surface morphology.

10. A process according to claim 4 wherein the convex mould surface is made of glass and the opposed concave mould surface is made of polypropylene.

11. A process according to claim 4, wherein the moulding mixture includes an organic polymerisation initiator.

12. A process according to claim 4 wherein the principal monomer component of the moulding mixture is hydroxyethyl methacrylate.

13. A process according to claim 12 wherein the moulding mixture also includes one or more of N-vinyl pyrrolidone, methacrylic acid and its esters.

14. A process according to claim 12 wherein the moulding mixture also includes a minor proportion of difunctional or polyfunctional polymerisable monomers to enhance cross-linking of the hydrogel polymer.

15. A process according to claim 14 wherein the difunctional or polyfunctional monomers are chosen from divinylbenzene, ethylene glycol diacrylate, ethylene glycol dimethacrylate, propylene glycol diacrylate, propylene glycol dimethacrylate and trimethylol propane trimethacrYlate.

16. A process according to claim 12, wherein the polymerisation is caused by heating the moulding mixture in the mould at a temperature rising from substantially 65° C. to substantially 100° C. over a period of substantially 1¼ hours, followed by a secondary cure at substantially 120° C. for substantially ½ hour.

* * * * *